US010305246B1

(12) United States Patent
Takehisa

(10) Patent No.: US 10,305,246 B1
(45) Date of Patent: May 28, 2019

(54) IODINE LASER BASED DEFENSE SYSTEM

(71) Applicant: Kiwamu Takehisa, Kawasaki (JP)

(72) Inventor: Kiwamu Takehisa, Kawasaki (JP)

( * ) Notice: Subject to any disclaimer, the term of this patent is extended or adjusted under 35 U.S.C. 154(b) by 0 days.

(21) Appl. No.: 15/824,588

(22) Filed: Nov. 28, 2017

(51) Int. Cl.
*H01S 3/22* (2006.01)
*F41H 13/00* (2006.01)
*H01S 3/036* (2006.01)
*H01S 3/095* (2006.01)

(52) U.S. Cl.
CPC .......... *H01S 3/2215* (2013.01); *F41H 13/005* (2013.01); *H01S 3/036* (2013.01); *H01S 3/095* (2013.01)

(58) Field of Classification Search
CPC ....... F41H 13/005; H01S 3/2215; H01S 3/095
See application file for complete search history.

(56) References Cited

U.S. PATENT DOCUMENTS

| 4,653,062 A * | 3/1987 | Davis ................... H01S 3/2215 372/89 |
| 5,229,100 A * | 7/1993 | Harpole ................... B01J 10/02 372/55 |
| 2011/0173996 A1* | 7/2011 | Glajchen ............ G01R 33/3804 62/48.2 |

OTHER PUBLICATIONS

Zagidullin, "Efficient chemical oxygen-iodine laser with longitudinal flow of the active medium," 1999, Quantum Electron. 29, pp. 114-116. (Year: 1999).*

Hochstetler, "Airshhips for the 21st Century," 2010, IEEE Spectrum, pp. 1-7. (Year: 2010).*
Carroll, D., "Chemical Laser Modeling with Genetic Algorithms," AIAA Journal, vol. 34, No. 2, Feb. 1996, 9 pages.
Rittenhouse, T. et al., "Performance of a High-Efficiency 5-cm Gain Length Supersonic Chemical Oxygen-Iodine Laser," IEEE Journal of Quantum Electronics, vol. 35, No. 6, Jun. 1999, 10 pages.
Endo, M. et al., "History of COIL development in Japan: 1982-2002," SPIE Proceedings vol. 4631: High Power Lasers and Applications—Gas and Chemical Lasers and Intense Beam Applications III, Jan. 20, 2002, San Jose California, 12 pages.
Hurlock, S. et al., "COIL Technology development at Boeing," SPIE Proceedings vol. 4631: High Power Lasers and Applications—Gas and Chemical Lasers and Intense Beam Applications III, Jan. 20, 2002, San Jose California, 16 pages.
Riker, J., "An Overview of the Space-Based Laser (SBL) Program," SPIE Proceedings vol. 4632: High-Power Lasers and Applications—Laser and Beam Control Technologies, Jan. 20, 2002, San Jose, California, 6 pages.
Duff, E. et al., "Chemical Oxygen Iodine Laser (COIL) Technology and Development," SPIE Proceedings vol. 5414: Defense and Security—Laser Technologies for Defense and Security, Apr. 12, 2004, Orlando, Florida, 17 pages.
Duff, E. et al., "The Magic of Relay Mirrors," SPIE Proceedings vol. 5413: Defense and Security—Laser Systems Technology II, Apr. 12, 2004, Orlando, Florida, 8 pages.
Jamison, L. et al., "High-Altitude Airships for the Future Force Army," RAND Technical Report No. 234, Available as Early as Jan. 1, 2005, 75 pages.

(Continued)

*Primary Examiner* — Michael Carter
(74) *Attorney, Agent, or Firm* — McCoy Russell LLP

(57) ABSTRACT

The disclosed invention relates to a COIL based defense system which stays at an altitude of higher than 17 km. The defense system is comprised of a high-altitude airship which carries a COIL in which gases flow along the optical axis with several exit ports. Since the COIL can operate without a vacuum pump, it can be lightweighted.

7 Claims, 21 Drawing Sheets

(56) References Cited

OTHER PUBLICATIONS

Kodymova, J., "COIL—Chemical Oxygen-Iodine Laser: Advances in development and applications," SPIE Proceedings vol. 5958: Congress on Optics and Optoelectronics—Lasers and Applications, Aug. 28, 2005, Warsaw, Poland, 11 pages.
Tofsted, D. et al., "An Atmospheric Turbulence Profile Model for Use in Army Wargaming Applications I," U.S. Army Research Laboratory Technical Report No. 3748, Feb. 2006, 61 pages.
Sprangle, P. et al., "Propagation of High Energy Laser Beams in Various Environments," U.S. Naval Research Laboratory Technical Report No. 6790-07-9032, Jun. 8, 2007, 61 pages.
"Altitute air pressure calculator," Altitude.org Website, Available Online at http://www.altitude.org/air_pressure.php, As last updated Apr. 2010, 1 page.
Azyazov, V. et al., "A simplified kinetic model for the COIL active medium," SPIE Proceedings vol. 7915: SPIE LASE—High Energy/Average Power Lasers and Intense Beam Applications V, Jan. 22, 2011, 15 pages.

* cited by examiner

IODINE LASER BASED DEFENSE SYSTEM

BACKGROUND

The present invention relates to a defense system based on a chemical oxygen-iodine laser.

Concerning an iodine laser which emits 1.315 μm radiation from an excited iodine atom $I(^2P_{3/2})$, a Chemical Oxygen-Iodine Laser is called a COIL. The COIL is well known to be able to operate at a high-power CW (continuous wave) mode. In order to operate the COIL, a singlet oxygen molecule ($O_2(^1\Delta_g)$) is generated from the chemical reaction of chlorine gas with a BHP solution. The BHP solution is a mixed solution of hydrogen peroxide solution ($H_2O_2$) and potassium hydroxide (KOH) or sodium hydroxide (NaOH). The $O_2(^1\Delta_g)$ is sometimes called singlet oxygen. A reaction chamber to generate the singlet oxygen is usually called SOG (singlet oxygen generator). By mixing the generated $O_2(^1\Delta_g)$ with iodine molecules, the iodine molecules are dissociated into iodine atoms. Further, the excited iodine atom ($I(^2P_{3/2})$) is produced by the energy transfer of $O_2(^1\Delta_g)$ to a basic iodine atom ($I(^2P_{1/2})$). Thus, a COIL runs the laser operation. Stephen C. Hurlick, et al., "COIL technology development at Boeing," Proceedings of SPIE Vol. 4631, 101-115 (2002), Masamori Endo, "History of COIL development in Japan: 1982-2002," Proceedings of SPIE Vol. 4631, 116-127 (2002), Edward A. Duff and Keith A. Truesdell, "Chemical oxygen iodine laser (COIL) technology and development," Proceedings of SPIE Vol. 5414, 52-68 (2004) and Jarmila Kodymova, "COIL-Chemical Oxygen Iodine Laser: Advances in development and applications," Proceedings of SPIE Vol. 5958, 595818 (2005) explain about the COIL.

During a COIL operation, singlet oxygen and iodine molecules with a buffer gas, such as helium or nitrogen, are supplied into a laser cavity. At the same time, a vacuum pump is used to pump out effluents, such as deactivated oxygen, iodine molecules and the buffer gas, from the laser cavity. This is because the total pressure in the laser cavity needs to be typically less than about 1000 Pa (about 7.5 Torr).

Chemical lasers have an advantage over other lasers if they are used in space. This is because a chemical laser basically can operate without an electric power supply. Moreover, a vacuum pump is not necessary when a chemical laser is used in space. Therefore, an HF chemical laser is considered to be a primary candidate laser for such a space-based defense system. Jim F. Riker, et al., "An Overview of the Space-Based Laser (SBL) Program," Proc. SPIE 4632, 181 (2002) explain about space-based lasers. However, it is difficult to use a COIL as a space-based laser because the BHP solution requires gravity force to be gathered in a container of the SOG.

A laser beam from a COIL typically has a poor beam quality, which is another problem with using a COIL as a defense system that requires a high-quality beam in order to propagate for a long distance. This is because a Fresnel number of the laser cavity of a typical COIL is large, which gives a multi-transverse-mode oscillation. For example, a COIL, having a beam diameter of 5 cm and a cavity length of 1 m, gives a Fresnel number of about 475. A conventional COIL is illustrated in FIG. 12. Singlet oxygen generated in a SOG 201 flows in a supply duct 202, passes a laser cavity 203, flows in an exit duct 204, and flows to the outside. Effluent gases such as oxygen and iodine are pumped out to the outside through the exit duct 204 by a vacuum pump (not shown). The laser cavity 203 has a rear mirror 206 and a front mirror 207 from which a laser beam L200a is extracted. As is shown in FIG. 12, the gas flow direction and the optical axis are orthogonal to each other. This makes the cross-section of the extracted laser beam L200a have a rectangular cross-section, not a circular one, which makes it difficult to oscillate at a single transverse mode (TEM00) due to the short laser cavity 203.

The purpose of the present invention is to provide a COIL based defense system, in which a high-power and a high-quality beam can be extracted. Another purpose is to provide a lightweight COIL that can be carried by a high-altitude airship easily. A high-altitude airship is explained by Lewis Jamison, Geoffrey S. Sommer, Isaac R. Porche III, "High-Altitude Airships for the Future Force Army," Technical Report, The RAND Corporation (2005). A high-altitude airship is briefly shown as a HAA. http://www.rand.org/content/dam/rand/pubs/technical_reports/2005/RAND_TR423.pdf.

Another purpose is to provide a COIL which does not require electric power supply.

SUMMARY

In order to achieve the above purposes, a defense system according to the present embodiment includes a COIL which includes a laser cavity and a SOG, the laser cavity including a plurality of input ports connected to the SOG and a plurality of exit ports connected to outside, and an HAA carrying the COIL and staying at an altitude of higher than 17 km.

The above and other objects, features and advantages of the present invention will become more fully understood from the detailed description given herein below and the accompanying drawings which are given by way of illustration only, and thus are not to be considered as limiting the present invention.

DESCRIPTION OF EMBODIMENTS

Figure 1:
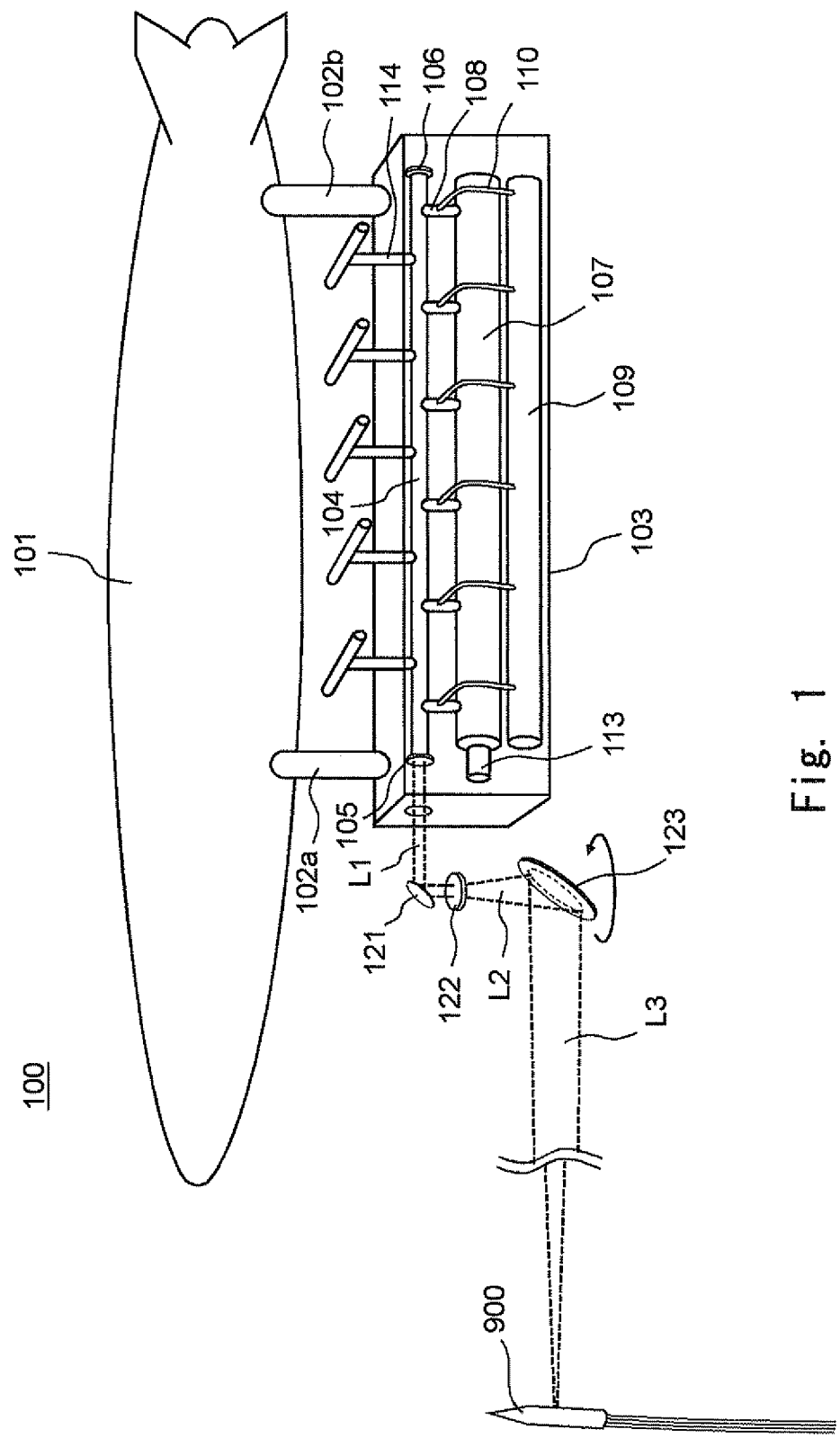
FIG. 1 is a schematic drawing of the iodine laser based defense system 100 according to the first embodiment.

Exemplary embodiments of the present invention are explained with reference to the attached drawings. The exemplary embodiments explained below are merely examples of the present invention, and the present invention is not limited to these exemplary embodiments. Note that components denoted by the same reference numerals in the specification and drawings indicate the same components.

First Embodiment

Hereinafter, the first embodiment according to the present disclosure is described based on FIG. 1. FIG. 1 is a concept drawing of an iodine laser based defense system 100. The defense system includes an HAA 101 that carries a COIL 103 by arms 102a and 102b. The HAA 101 which is filled with helium, stays at an altitude of about 20 km. The COIL 103 includes a SOG 107 and a laser cavity 104. The laser cavity 104 is connected to input ports 108 and exit ports 114. In order to oscillate the COIL 103, singlet oxygen is supplied into the laser cavity 104 from the SOG 107 through the input ports 108. A buffer gas such as $N_2$ gas is also supplied into the laser cavity 104 from the SOG 107 through the input ports 108. The laser cavity 104 includes a front mirror 105 and a rear mirror 106. Herein, the term "laser cavity" not only indicates the configuration of the front mirror 105 and the rear mirrors 106, but also indicates a space which is filled with gases such as singlet oxygen, iodine and buffer gas.

If the input ports 108 and the exit ports 114 are metal pipes, the input ports 108 and the exit ports 114 are corroded by unreacted chlorine gas. Therefore, the input ports 108 and the exit ports 114 are preferably non-metal pipes such as glass pipes or chloroethene pipes. The input ports 108 are connected to an $I_2$ and $N_2$ reservoir 109 through pipes 110. The mixed gas of $I_2$ and $N_2$ is also supplied into the laser cavity 104 from the reservoir 109. The laser cavity 104 is connected to outer space through the exit ports 114.

Since the COIL 103 has a long laser cavity 104, it can easily produce a high-quality laser beam L1. This will be explained later. The extracted laser beam L1 reflects at a bend mirror 121, and goes through a concave lens 122. The concave lens 122 expands the laser beam L2 to a diameter of about 6 m in this case. The laser beam L2 comes to a large focusing mirror 123. The focusing mirror 123 directs the laser beam L3 to a target missile 900. The focusing mirror 123 is a concave mirror and focuses the laser beam L3 on the missile 900. The focusing mirror 123 can rotate to direct the laser beam L3 to any radial direction. The laser beam L3 propagates over a long distance to the target missile 900.

Figure 2:
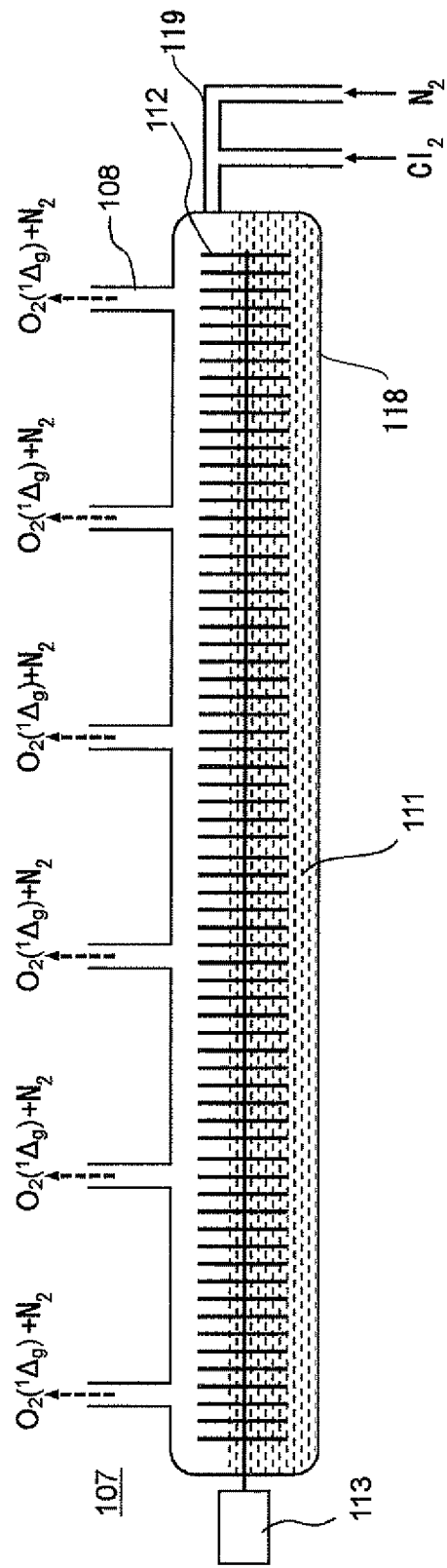
FIG. 2 is a schematic drawing of the SOG 107.

The details of the SOG 107 of the COIL 103 are also shown in FIG. 2. As illustrated in FIG. 2 the SOG 107 is a rotating disk type SOG. The SOG 107 includes many disks 112 and a housing 118. The housing 118 stores a BHP solution 111 which is a mixed solution of hydrogen peroxide solution ($H_2O_2$) and potassium hydroxide (KOH) or sodium hydroxide (NaOH). The disks 112 are half soaked in the BHP solution 111. The disks 112 are rotated by a motor 113. Since the COIL 103 is carried by the HAA 101, and is not a space-based laser, the BHP solution 111 can be quietly stored in the housing 118. The housing 118 is connected to an injection pipe 119. The $Cl_2$ and $N_2$ gases are supplied into the housing 118 from reservoirs (not shown) through the injection pipe 119. Since the injection pipe 119 is equipped with valves (not shown), the $Cl_2$ gas and $N_2$ gas are independently supplied into the housing 118 through the injection pipe 119. Although the injection pipe 119 is drawn to be attached at the right end of the housing 118, many injection pipes 119 would preferably be attached on the side of the long housing 118 to increase the total gas flow rate. The rotating disk type SOG is explained in U.S. Pat. No. 5,229,100 by George M. Harpole and "Performance of a High-Efficiency 5-cm Gain Length Supersonic Chemical Oxygen-Iodine Laser" by Tilghman L. Rittenhouse, Stephen P. Phipps, and Charles A. Helms.

The reason for using a rotating disk type SOG 107 is explained. At the altitude of around 20 km, the viscosity of the BHP solution 111 becomes high because the temperature of the BHP solution becomes around −10 degrees Celsius at such high altitude since the outside air temperature becomes lower than −10 degrees Celsius. But a rotating disk type SOG basically can easily operate using a high-viscosity BHP solution. On the other hand, a spray type and/or a bubbler type SOG usually requires a low viscosity solution. This is because making small droplets is difficult if the viscosity of the solution is high in the spray type and the bubbler type SOGs. At such a low temperature, the vapor pressure of the BHP solution becomes low enough to oscillate a COIL without using a water vapor trap. Since the BHP solution 111 can be kept at the optimum temperature of around −10 degrees Celsius without using a cooling device, the total weight of the COIL 103 is reduced.

Figure 3:
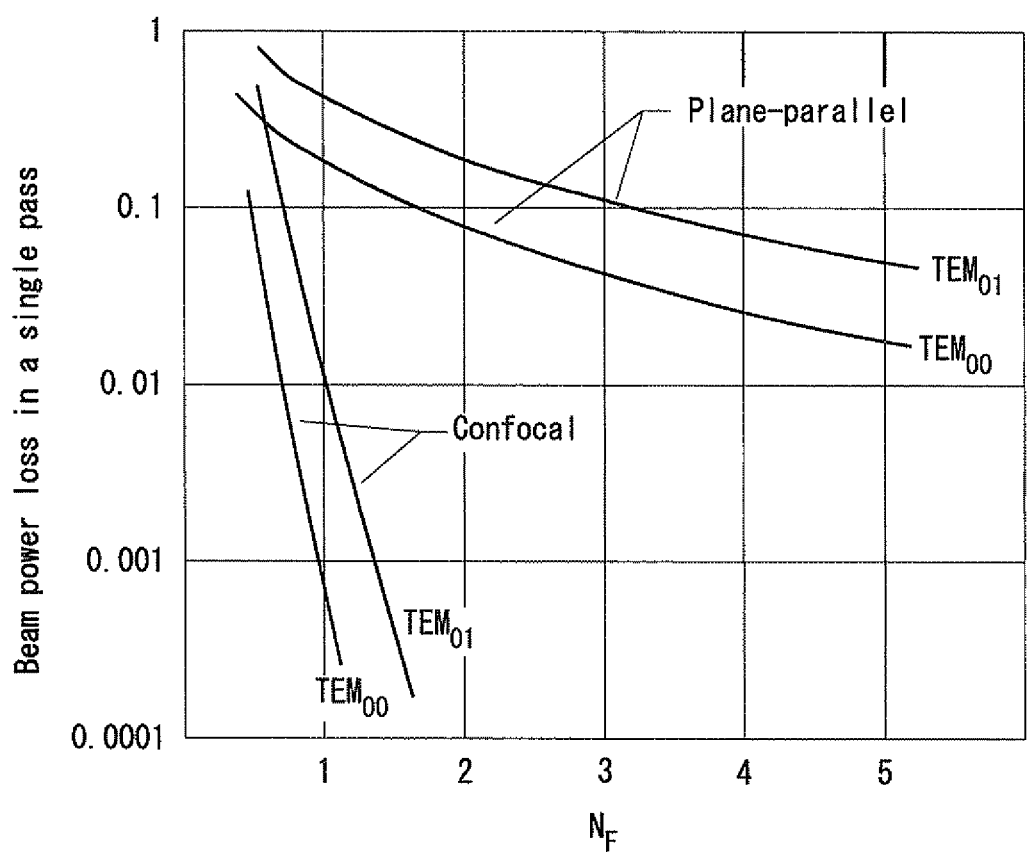
FIG. 3 is a graph showing beam power loss as a function of a Fresnel number.

One of the features of the present embodiment is that it is possible to use the long laser cavity 104 whose Fresnel number becomes small. A Fresnel number ($N_F$) is expressed as the following formula (1).

$$N_F = a^2/(\lambda L) \tag{1},$$

where a is a radius of the mirror, L is the length of the cavity and $\lambda$ is the laser wavelength which is 1.315 um. As shown in FIG. 3, a smaller Fresnel number gives a larger loss due to diffraction. Therefore, in the long laser cavity with a small Fresnel number only a single transverse electromagnetic mode (TEM00 mode) can oscillate, and a higher transverse electromagnetic mode such as TEM01 can be suppressed. Additionally, since the supplied gases flow along the optical axis of the laser cavity 104, the cross-section of the laser beam L1 is a circular shape. Such a laser beam with the circular shape cross-section extracted from the long laser cavity 104 is also advantageous to oscillate at the TEM00 mode. The TEM00 mode beam is called a Gaussian beam which has the smallest divergence of all the modes. Consequently, it is suitable for delivering the beam for a long distance.

Figure 12:
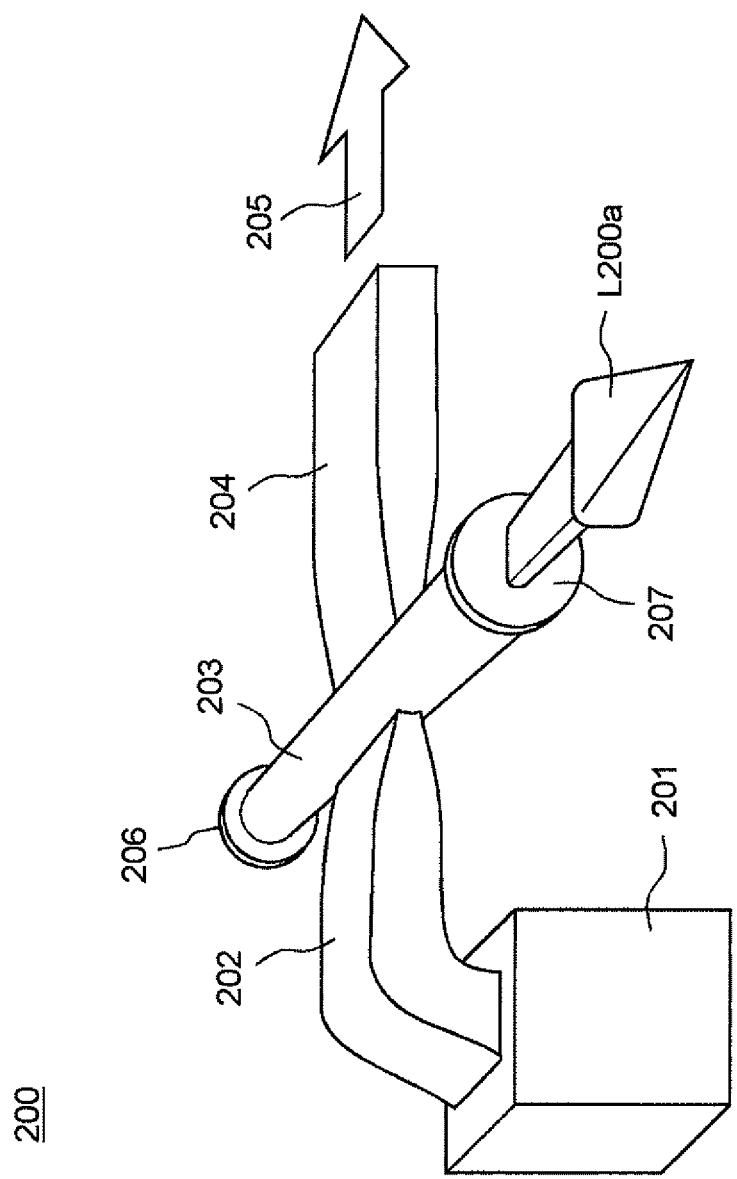
FIG. 12 is a schematic drawing of a conventional COIL 200.
Figure 13:
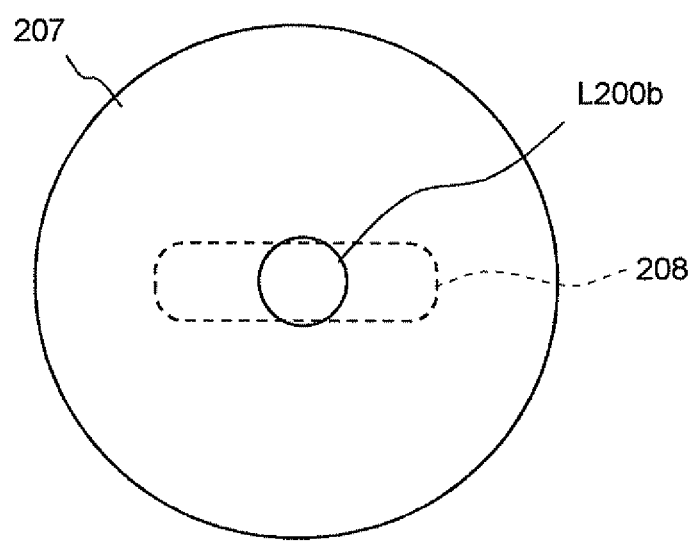
FIG. 13 is a schematic drawing of laser oscillation with a pinhole for the COIL 200.

On the other hand, in the conventional COIL 200, as shown in FIG. 12, the extracted laser beam L200a from the short laser cavity 203 has a rectangular cross-section. This gives a poor beam quality due to a large Fresnel number. Therefore, in order to oscillate at a single transverse mode, it is necessary to provide a pinhole plate 207 in the laser cavity 203. However, as shown in FIG. 13, the oscillated laser beam L200b has a beam cross-section which is much smaller than an active area 208. Consequently, the laser oscillating efficiency is greatly reduced compared with the COIL having the laser cavity without the pinhole plate. Therefore, the COIL 103 according to the present embodiment can oscillate at the TEM00 mode without reducing the oscillating efficiency since its active area has a small cross-section.

Figure 4:
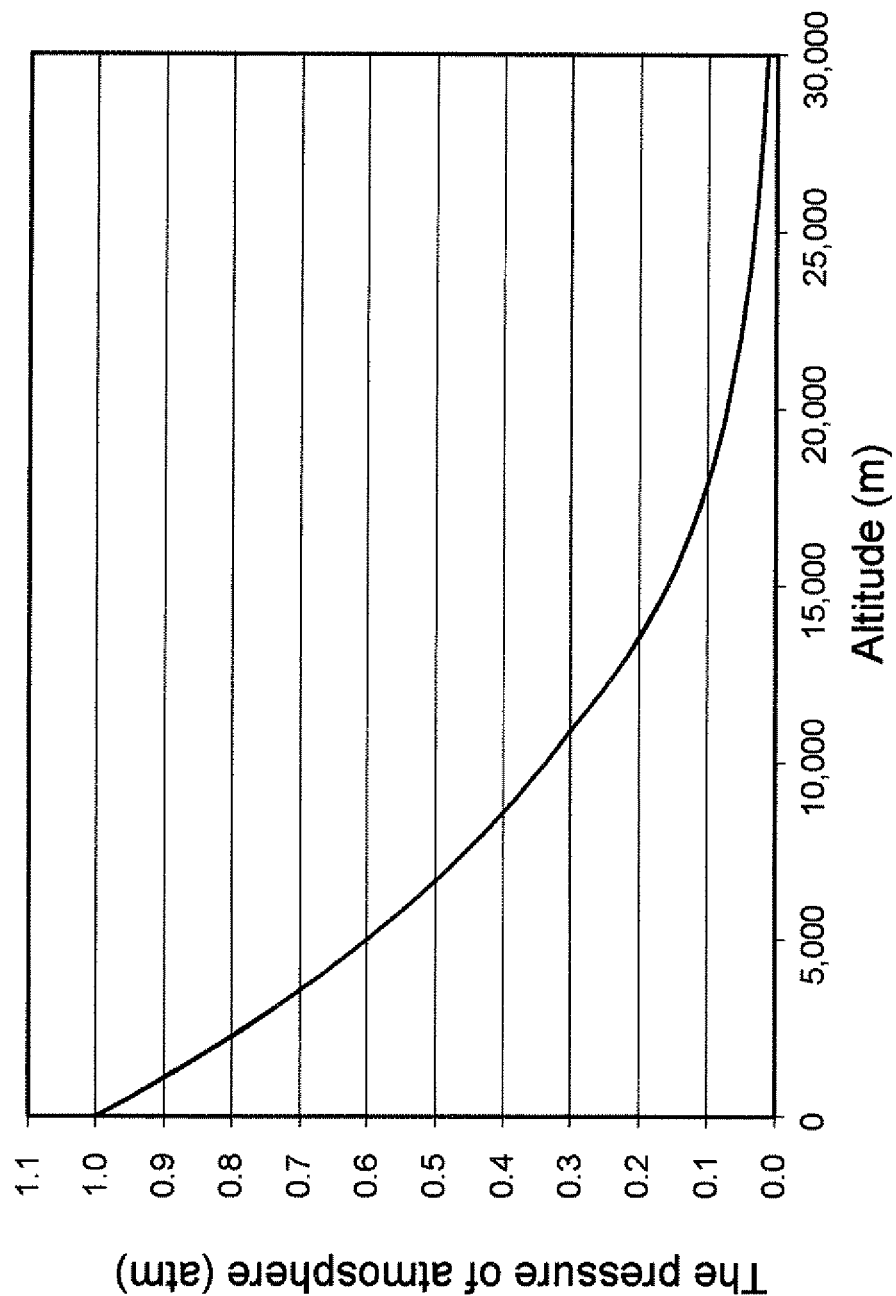
FIG. 4 is a graph showing the pressure of atmosphere as a function of altitude.

The defense system 100 uses the HAA 101 which stays at the altitude of higher than 17 km. If the altitude is higher than 17 km, atmospheric pressure becomes less than about 0.10 atm (10 kPa) as shown in FIG. 4. Atmospheric pressure as a function of altitude is referred to at various calculation sites such as http://www.altitude.org/air_pressure.php. Therefore, the effect of thermal blooming and the absorption, which reduce irradiation intensity at the target, become about 1/10 smaller than that in the case of propagating near the surface of the earth.

Figure 14:
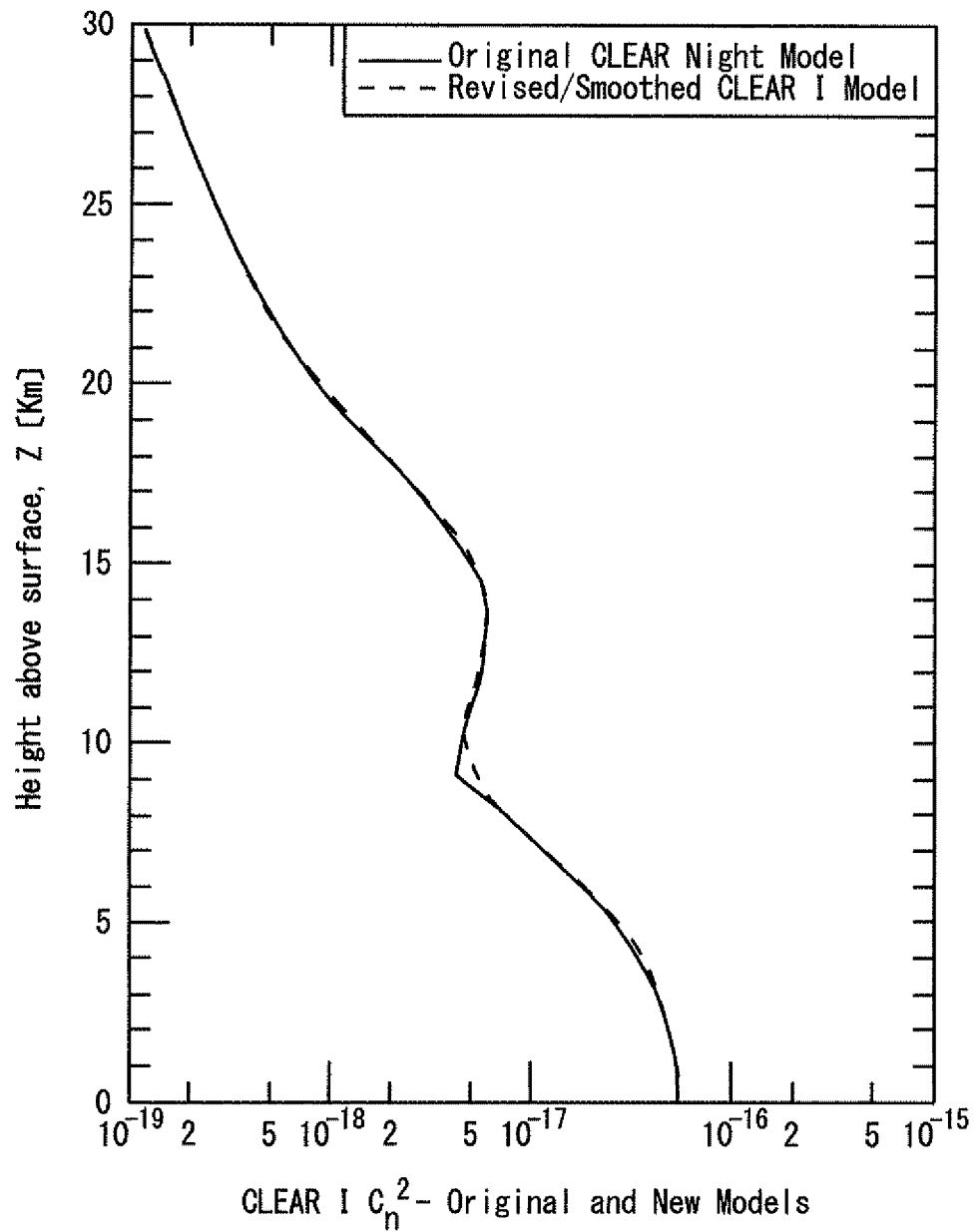
FIG. 14 is a graph showing the relation of $C_n^2$ value and the altitude.

Since the HAA 101 stays at the altitude of about 20 km, the turbulence structure parameter $C^2_n$ becomes around $10^{-18}$ which is less than 1/10 of that at the surface of the earth as shown in FIG. 14. This matter is explained by "An Atmospheric Turbulence Profile Model for Use in Army Wargaming Applications I" by David H. Tofsted, Sean G. O'Brien, and Gail T. Vaucher, ARL-TR-3748.

The estimation of the spot diameter at the target missile 900 considering the atmospheric turbulence is explained. The spot diameter is estimated from the beam divergence considering both diffractive spreading and the turbulence induced spreading. The half angle $\theta_{diff}$ of diffractive spreading is calculated by the following formula (2).

$$\theta_{diff} \sim 2M^2 \lambda / \pi D \quad (2),$$

where $M^2$ is a beam quality parameter which is about 1.0 since the extracted laser beam L1 can be diffraction limited, $\lambda$ is the laser wavelength which is 1.315 um, and D is the initial beam diameter of the laser beam L3 which is about 6 m in this embodiment. While the half angle $\theta_{turbulence}$ of turbulence induced spreading is calculated by the following formula (3).

$$\theta_{turbulence} \sim 2(C^2_n L/\lambda^{1/3})^{3/5} \quad (3),$$

where L is the distance to the target. The spot diameter d at the distance L considering both the above spreads is expressed as the following formula (4).

$$d \sim 2\sqrt{(\theta diff^2 + \theta_{turbulence}^2)}L \quad (4)$$

Figure 15:
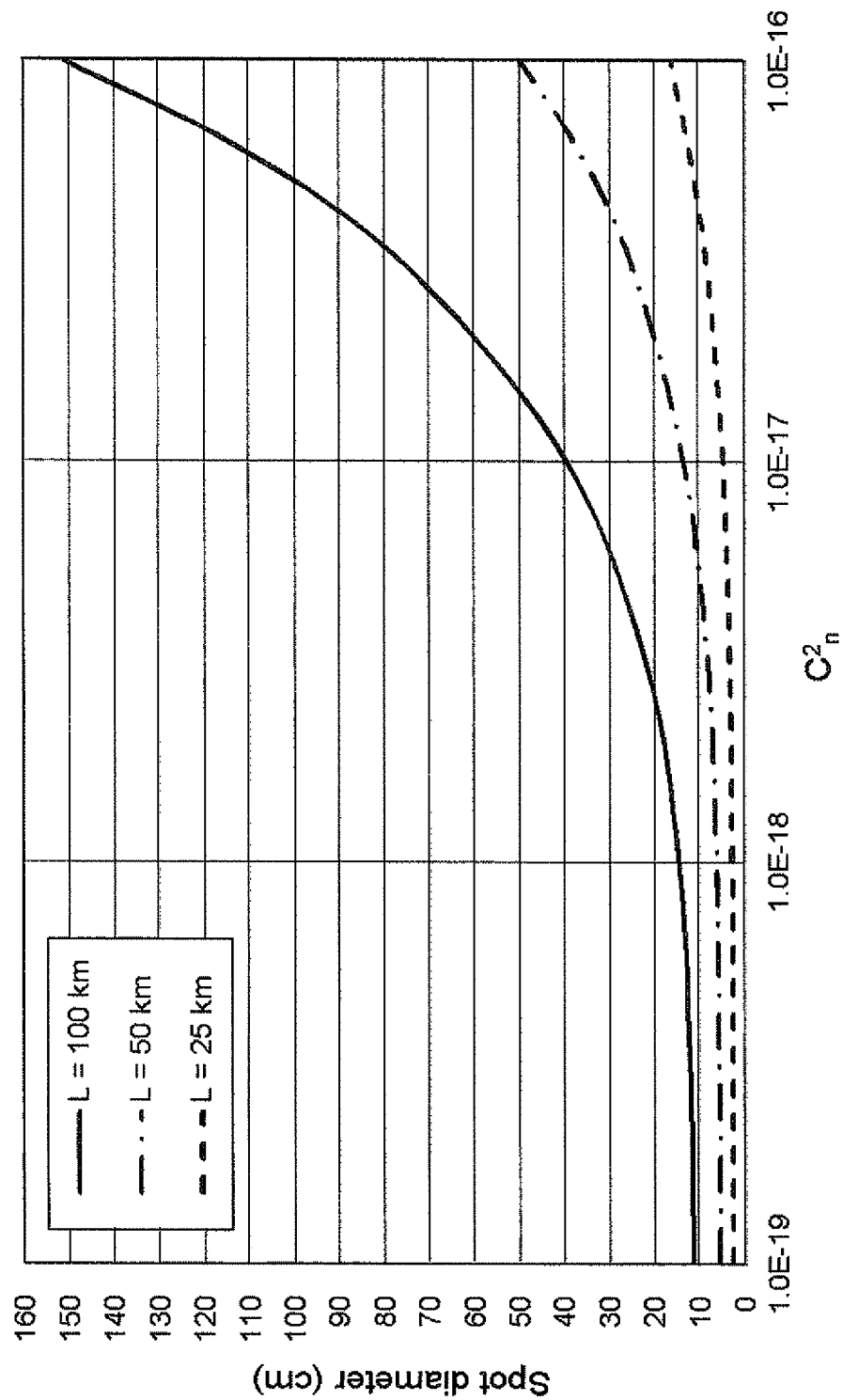
FIG. 15 is a graph showing the spot diameter as a function of $C_n^2$ value.

The calculated spot diameter d as a function of $C^2_n$ with a parameter of the distance is shown in FIG. 15. At $C^2_n$ value of about $10^{-18}$, if the target missile 900 is located at a distance of 100 km, the irradiation intensity becomes about 6 kW/cm² with a laser power of 1 MW. This can damage a housing of the target 900 by shorter than 1 sec. of irradiation. On the contrary, if the COIL is located near the earth surface, the beam diameter becomes as much as about 1 m due to a large $C^2_n$ of around $5\times10^{-17}$. This gives an irradiation intensity of as low as about 0.1 k W/cm². This makes it almost impossible to shoot down the target 900. This is the reason for the present embodiment using an HAA to lift up the COIL 103 at low $C^2_n$ atmosphere. The beam diameter in the case of propagating in a turbulent air is explained by "Propagation of High Energy Laser Beams in Various Environments" by Phillip Sprangle, Joseph Penano, Naval Research Laboratory, Jun. 8, 2007.

The beam propagation in such a low turbulence provides another advantage for the present embodiment. The defense system does not have to be equipped with an adaptive optics, such as deformable mirror. The adaptive optics is necessary for a conventional laser-based defense system. Therefore, the COIL 103 can be made lightweighted.

Another feature of the present embodiment is that a vacuum pump is not necessary for the COIL 103. Since the COIL 103 stays at the altitude of about 20 km, the outside atmospheric pressure is very low. Therefore, the COIL 103 can oscillate without gases having to be pumped out before and during the laser operation by using a vacuum pump. Thus, a vacuum pump is not necessary for the COIL 103. This is beneficial for the COIL 103 as it can be made farther lightweighted since a high-pumping-rate vacuum pump is quite heavy. Moreover, the vacuum pump requires electric power supply and cooling water. Therefore, the COIL 103 can be easily carried by an HAA.

Figure 5:
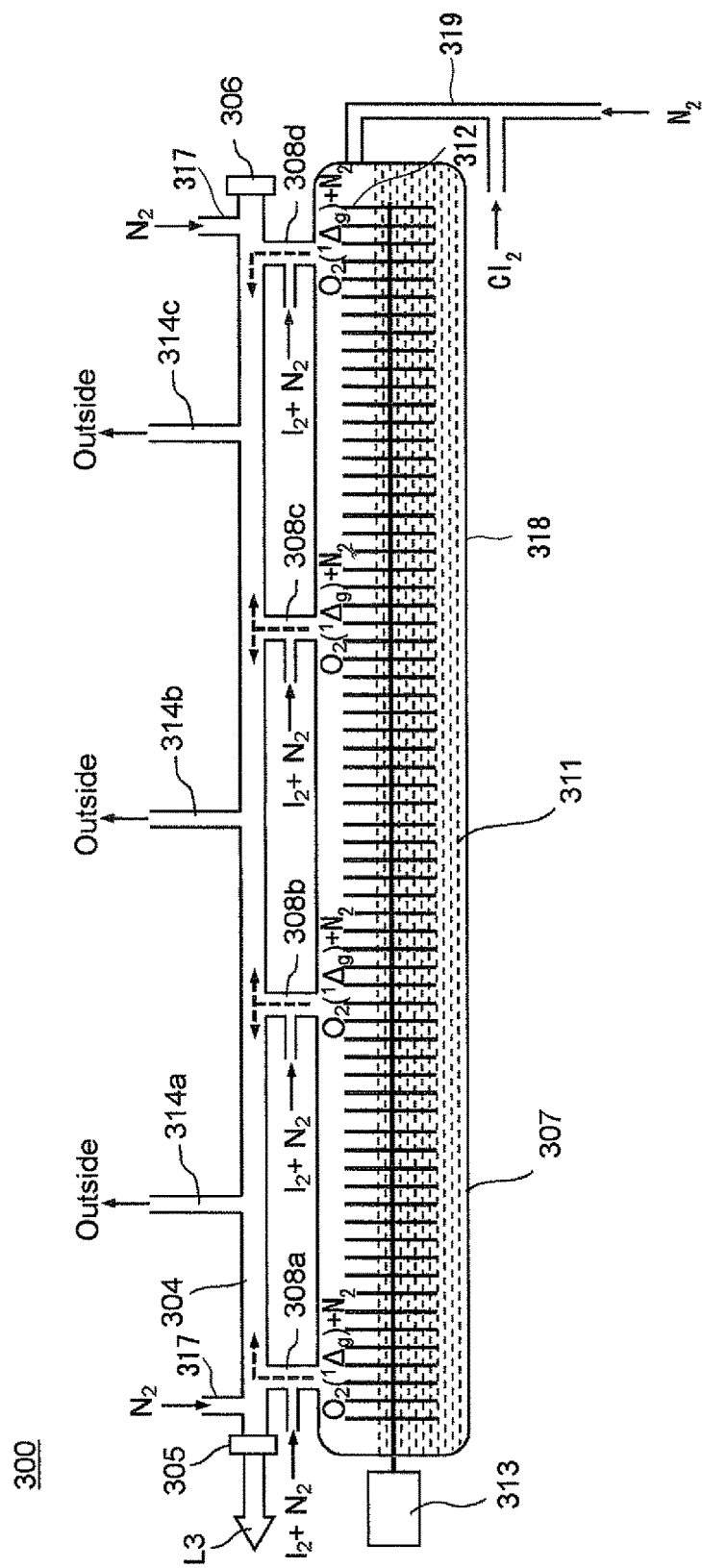
FIG. 5 is a schematic drawing of a COIL 300 for the simulation.

In order to confirm the laser operation without a vacuum pump, COIL 300 shown in FIG. 5 is simulated. The COIL 300 includes a laser cavity of about 6 m in length. The simulation is performed based on rate equations shown in V. N. Azyazov, S. Yu. Pichugin, M. C. Heaven, "A simplified kinetics model for the COIL active medium," Proceedings of SPIE Vol. 7915, 791505 (2011). Since the reactions include iodine molecule dissociation by the collision with $N_2$ molecule, the simulation is considered to simulate accurately in a high pressure $N_2$ environment. The calculations of gain and pressure broadening coefficients are referred to in "Chemical Laser Modeling with Genetic Algorithms" by David L. Carroll, AIAA Journal, Vol. 34, 338-346 (1996).

The COIL 300 includes an SOG 307. The SOG 307 includes rotating disks 312. The rotating disks 312 are half soaked in BHP solution 311. The rotating disks 312 are attached to a motor 313. The motor 313 rotates the rotating disks 312 before and during the laser operation.

$Cl_2$ gas is supplied into a housing 318 of the SOG 307 through an injection pipe 319 before and during the laser operation. The singlet oxygen and a buffer gas such as $N_2$ gas are supplied into the laser cavity 304 from SOG 307 through the input ports 308a to 308d. The effluents in the laser cavity 304 are flowed out to the outside through the exit ports 314a to 314c. Purge ports 317 are connected to the laser cavity 304 in the vicinity of each of the two mirrors 305 and 306, respectively. $N_2$ gas is supplied into the laser cavity 304 through the purge ports 317. Therefore, it is possible to keep surfaces of the mirrors 305 and 306 clean.

Figure 6:
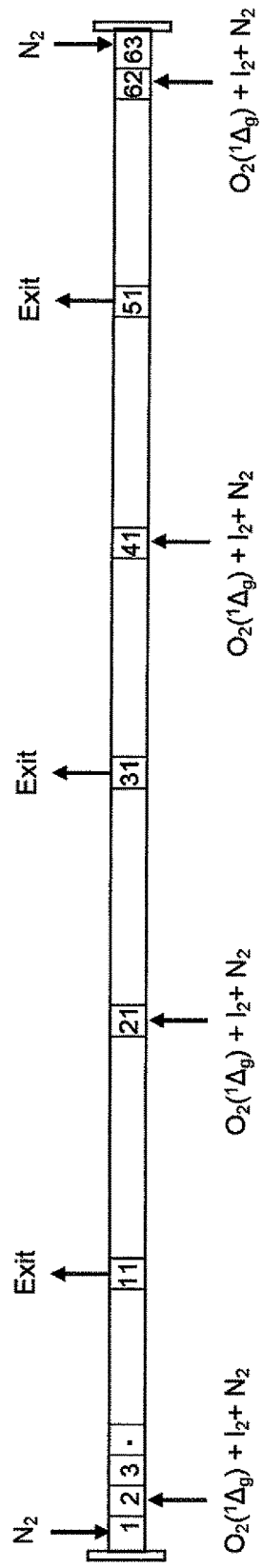
FIG. 6 is an explanation for the division of the laser cavity in the simulation.

For the simulation of the COIL 300, the laser cavity 304 is divided into 63 parts along the optical axis (FIG. 6). In each part, each gas is assigned a density. The simulation conditions are as follows:
Chlorine gas ($Cl_2$) flow rate: 30 mol/s
$O_2$ generation yield ($O_2$ flow rate divided by $Cl_2$ flow rate): 0.90
$O_2(^1\Delta_g)$ generation yield ($O_2(1 \Delta g)$ flow rate divided by that of total $O_2$): 0.60
Iodine molecule flow rate: 0.006 mol/s
$N_2$ gas flow rate: 0.06 mol/s
Cavity size: 6 m length and 10 cm inside diameter
Input ports (308a, 308b, 308c and 308d): 4 positions
Exit ports (314a, 314b and 314c): 3 positions with a diameter of 10 cm and a length of 1 m.

Figure 7:
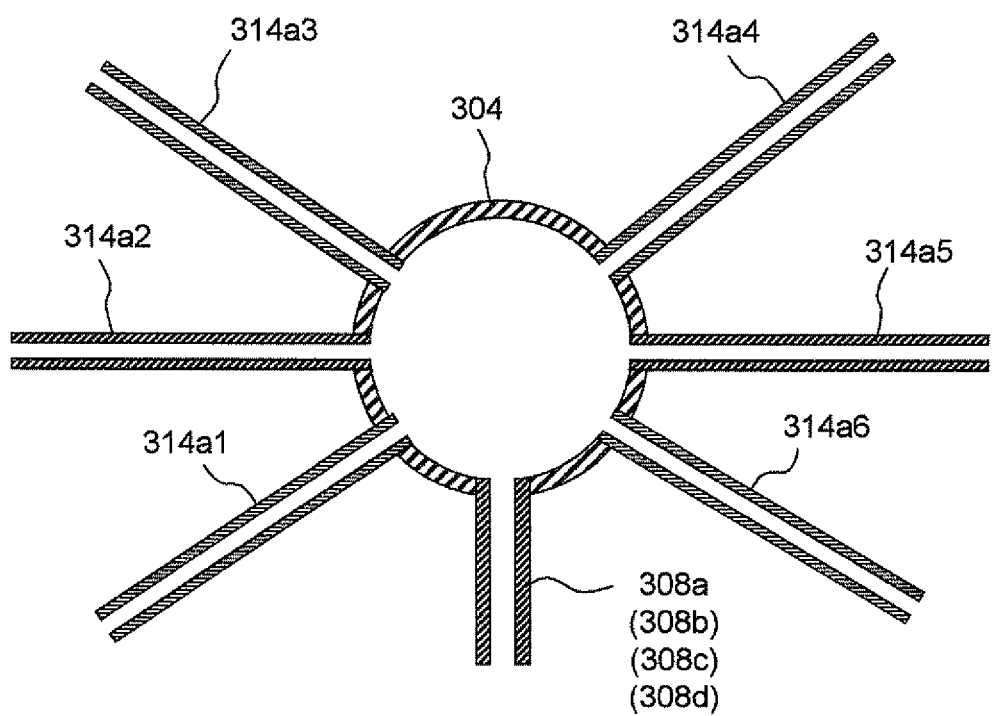
FIG. 7 is a cross-section drawing of the laser cavity of the COIL 300.

Buffer gas is assumed to be $N_2$. The buffer gas is used to inject the iodine molecules with a flow rate of 10 times higher than that of the iodine molecules. Although a single port is drawn for each exit port (314a, 314b and 314c) in the FIG. 5, there are six ports at one position in a direction parallel to the optical axis of the laser cavity to increase the flow rate of the effluents. This is shown in the cross-section view of FIG. 7. For example, the exit port 314a actually includes 6 ports 314a1, 314a2, 314a3, 314a4, 314a5 and 314a6 as shown in FIG. 7. The six exit ports 314a1 to 314a6 are arranged in a radial fashion. The six exit ports 314a1 to 314a6 are outwardly extended from the laser cavity 304. The flow speed of the gases in the 6 ports 314a1, 314a2, 314a3, 314a4, 314a5 and 314a6 is estimated using a pressure-dependent conductance called Knudsen formula which is valid for both viscous flow (higher than 100 Pa of the mean pressure) and transitional flow (between 1 Pa and 100 Pa of the mean pressure).

There is another reason for increasing the number of exit ports. By increasing the number of ports, relatively small diameter ports can be used without decreasing the total flow rate. The smaller the diameter, the lower its conductance becomes. Consequently, iodine molecules can easily be trapped during the transportation of them in the exit ports 314 since iodine molecules are cooled down at a temperature equal to the outside temperature which is around −50 degrees Celsius at the altitude of about 20 km.

Figure 8:
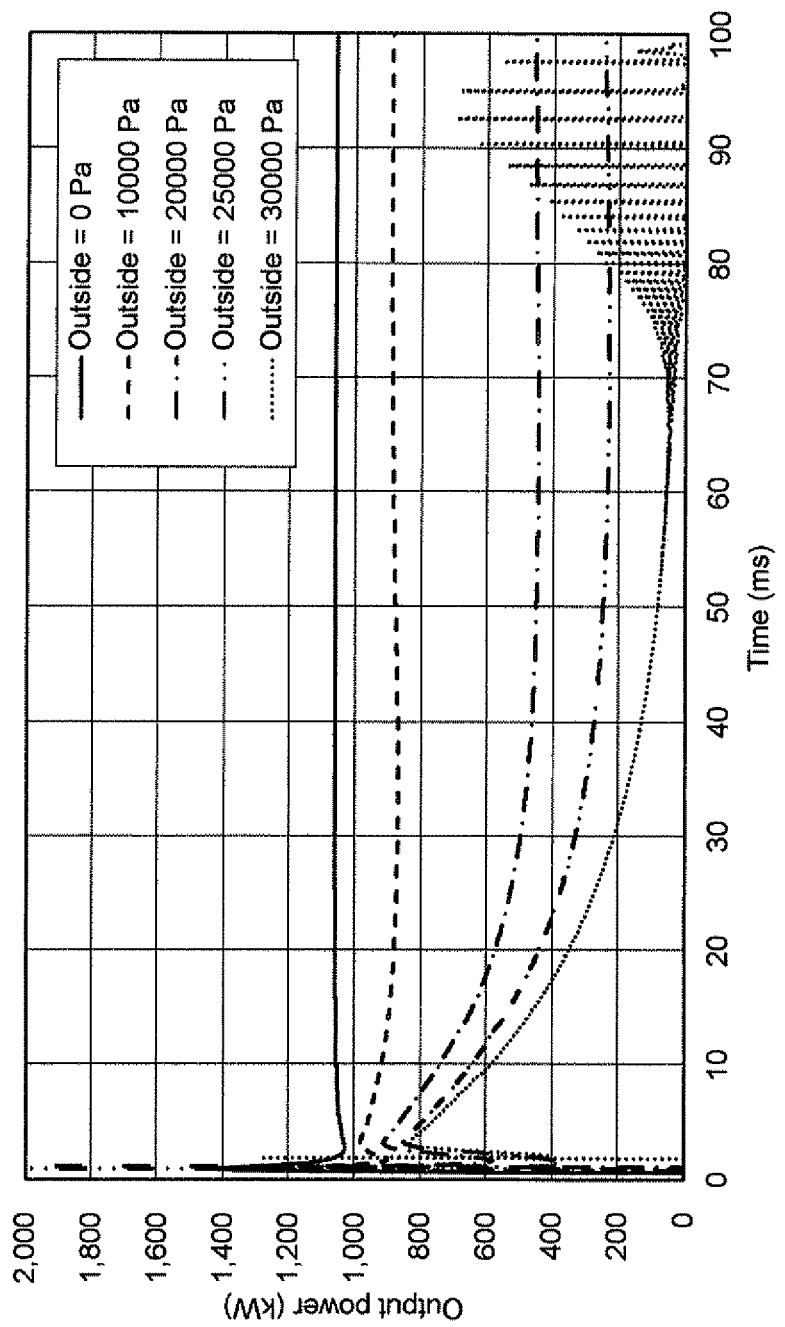
FIG. 8 is a simulation result showing the output power with a parameter of the outside pressure.

The simulation results, as parameters of outside pressure, are shown in FIG. 8. In the simulation, the gas initially filled in the cavity is assumed to be air, which is 21% oxygen and 79% nitrogen, having a pressure equal to that of the outside. The simulation results indicate that the COIL 300 can oscillate continuously if the outside pressure is less than 25,000 Pa (about 0.25 atm). This implies that if the COIL 300 stays at the altitude of higher than about 12 km, the COIL 300 can operate without having a vacuum pump. Therefore, the COIL 300, without having a vacuum pump, can be made lighter. Thus, it is advantageous to equip the COIL with an HAA. Preferably, the HAA stays at the altitude of higher than 17 km, where the outside pressure is less than about 10,000 Pa as shown in FIG. 4. In this case, the extractable output power is more than 80% of that if the outside is completely vacuumed. Since the HAA stays at an altitude if higher than 17 km, the HAA flies in the stratosphere. The air turbulence in the stratosphere is smaller than that in the troposphere. Therefore, the COIL can stably operate.

Figure 9:
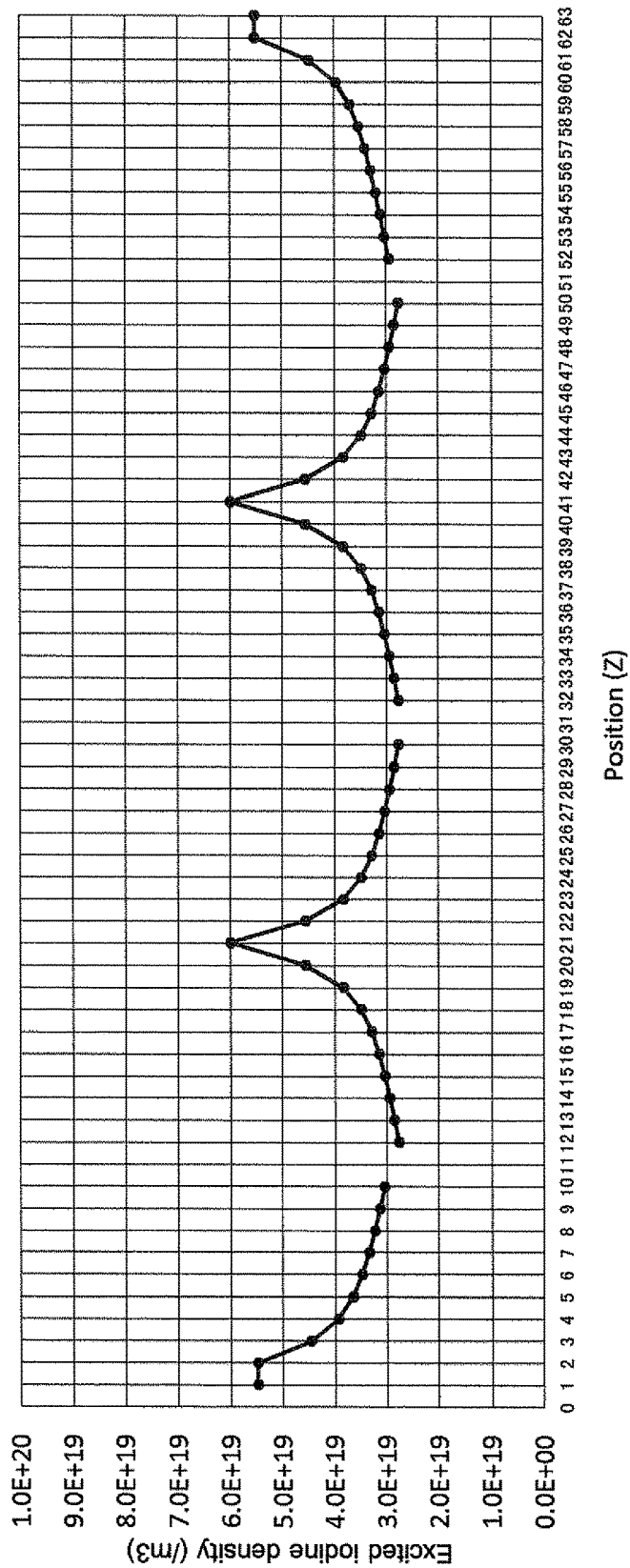
FIG. 9 is a simulation result showing the distribution of excited iodine density.

Another feature of the COIL of the present embodiment is that the COIL has many input ports and exit ports in order to supply the singlet oxygen quickly in the long laser cavity 304, and to flow out the effluent quickly from the long laser cavity 304. One of the reasons for a conventional COIL having a transverse flow, in which the optical axis is orthogonal to the gas flow, is a short gain length. This means that simply using a long laser cavity cannot increase the gain length. Therefore, in the present embodiment, the COIL has a plurality of input ports and a plurality of exit ports to achieve many high-gain portions. In order to confirm this achievement, the density of excited-state iodine inside the laser cavity 304 is plotted in FIG. 9 in the simulation conditions listed above. The plots indicate that excited iodine density becomes maximum at the positions of input ports 308a, 308b, 308c and 308d. This density decreases as a position (z) becomes further away from the position of the input port, and it becomes minimum at the positions where the exit ports 314a, 314b and 314c are connected. Therefore, in the present embodiment, the laser cavity 304 preferably has a plurality of input ports 314 and a plurality of exit ports. However, if such a long cavity with many exit ports is employed for a conventional COIL, many vacuum pumps are necessary. While in the present embodiment, since a vacuum pump is not necessary, the COIL can be made lightweighted. Thus, it is advantageous to carry the COIL by an HAA. Since the present COIL does not need a vacuum pump, it does not require electric power supply for the vacuum pump.

Second Embodiment

Figure 10:
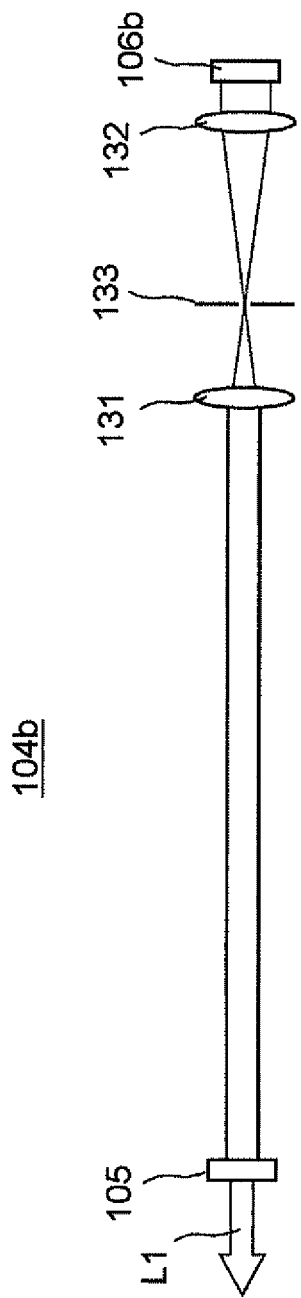
FIG. 10 is a schematic drawing of a laser cavity according to the second embodiment.

Hereinafter, the second embodiment of the defense system is described based on FIG. 10. FIG. 10 is a schematic drawing of a type of laser cavity 104b different from that in the first embodiment which can be applied in the COIL 103 illustrated in FIG. 1. The structure of the defense system other than the laser cavity 104b is the same as that of the defense system 100 according to the first embodiment. Therefore, the explanation will be omitted.

The laser cavity 104b includes a front mirror 105 and the rear mirror 106b. Inside the laser cavity 104b, convex lenses 131 and 132 are employed. The pinhole 133 is placed between the convex lens 131 and the convex lens 132. The convex lenses 131 and 132 focus the beam on the pinhole 133. The pinhole 133 can suppress the higher transverse modes. Consequently, the laser oscillation can be only at the TEM00 mode. Therefore, it is possible to oscillate a laser beam with high quality. The convex lens 131 and 132 have an anti-reflective coating on their surfaces.

Third Embodiment

Figure 11:
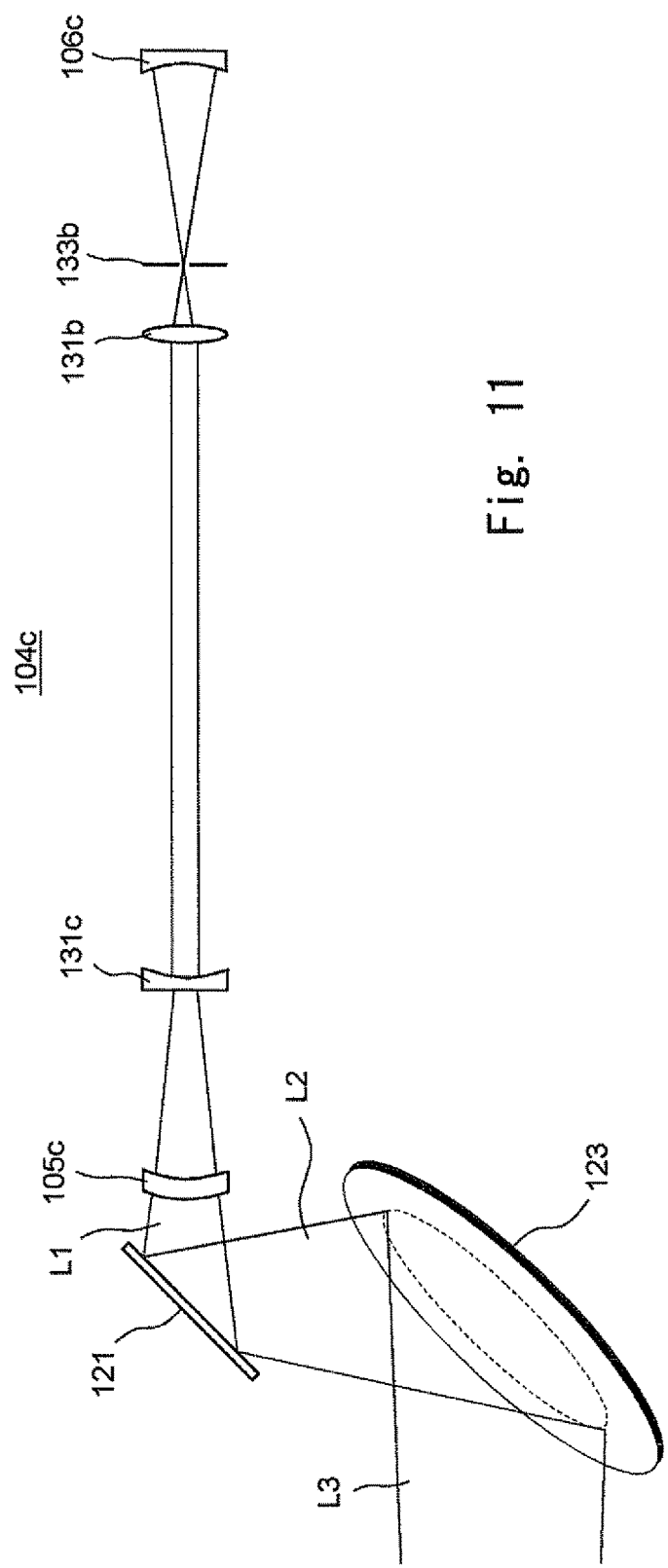
FIG. 11 is a schematic drawing of a laser cavity according to the third embodiment.

Hereinafter, the third embodiment of the defense system is described based on FIG. 11. FIG. 11 is a schematic drawing of a type of laser cavity 104c different from those of the first and second embodiments which can also be applied in the COIL 103 illustrated in FIG. 1. The structure of the defense system other than the laser cavity 104c is the same as that of the defense system 100 according to the first embodiment. Therefore, the explanation will be omitted.

The laser cavity 104c includes a front mirror 105c and a rear mirror 106c. Both the front mirror 105c and the rear mirror 106c have a concave inside surface. Inside the laser cavity 104c, a convex lenses 131b and a concave lens 131b are inserted between the two mirrors 105c and 106c. Inside the laser cavity 104c, the pinhole 133b is placed between the convex lens 131b and the rear mirror 106c. The convex lens 131b and a rear mirror 106c focus the beam on a pinhole 133b. The pinhole 133b can suppress the higher transverse modes. Consequently, the laser oscillation can be only at the TEM00 mode. As shown in FIG. 11, the exit laser beam L1 from the front mirror 105c is expanding. Therefore, after it is reflected by the mirror 121, the laser beam L2 expands to have a large diameter at the mirror 123. This can tightly focus the laser beam L3.

The advantage of the laser cavity 104c is that the laser beam intensity at the front mirror 105c and the rear mirror 106c can be small. Therefore, the possibility of damaging the reflection coating at the front mirror 105c and the rear mirror 106c can be reduced. Further, the surfaces of the convex lens 131b and the concave lens 131c have anti-reflective coating which typically has a higher damage threshold than that of a reflection coating.

Additional Simulation

Figure 16:
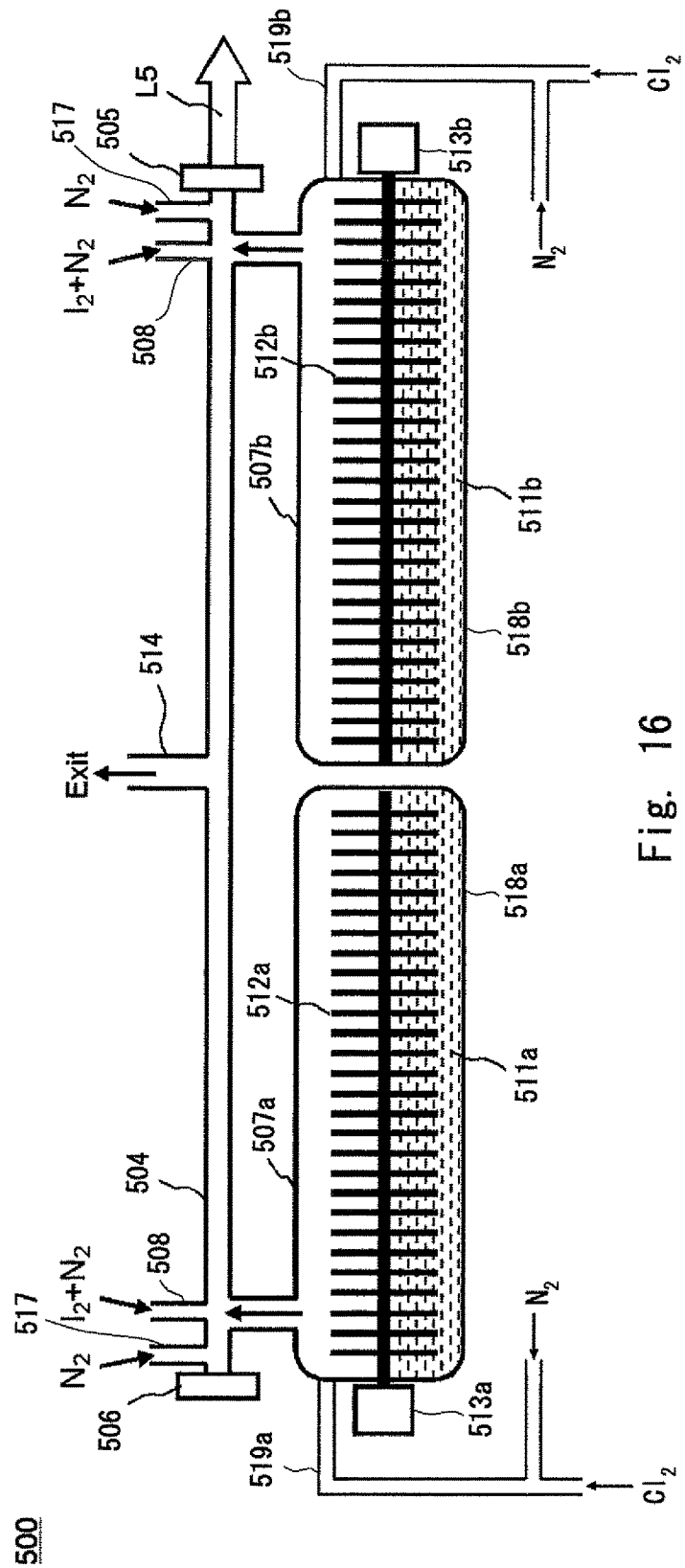
FIG. 16 is a COIL configuration for additional simulations.

Additional simulations have been performed for another model of a COIL 500 as shown in FIG. 16. COIL 500 includes a laser cavity 504. The purpose of performing the additional simulations is to confirm that a COIL 500 can oscillate when considering deactivation of $O_2(^1\Delta_g)$ inside the SOG. That is, it may be necessary for the SOG to be filled with the high-pressure buffer gas in order to get the pressure inside the SOG higher than that outside of the COIL.

The laser cavity 504 has 2 m-length and 0.1 m-inside-diameter. The laser cavity 504 includes a 99.9%-reflectance rear mirror 506 and a 99.0%-reflectance front mirror 505. The COIL 500 has two SOGs 507a and 507b. The SOG 507a includes a plurality of rotating disks 512a. The SOG 504b also includes a plurality of rotating disks 512b. The rotating disks 512a and 512b have a 30 cm diameter. The rotating disks 512a and 512b are half soaked in BHP solution 511a and 511b, respectively. The rotating disks 512a are placed with a pitch of 3 mm with a total length of 1 m. The rotating disks 512 b are also placed with a pitch of 3 m with a total length of 1 m. Therefore, the total number of rotating disks 512a and 512b is 666. The rotating disks 512a and 512b are attached to motors 513a and 513b, respectively, and thus rotate before and during the laser operation. $O_2(^1\Delta_g)$ generation rate from the reaction surface is assumed to be 0.1 mol/s/m$^2$, which is a typical value for a rotating-disk SOG. The yield of the initial $O_2(^1\Delta_g)$ is assumed to be 90% with the $Cl_2$ utilization of 90%.

The inputs ports 508 and the exit ports 514 are connected to the laser cavity 504. The purge ports 517 are also connected to the laser cavity 504 in the vicinity of the two mirrors 505 and 506, respectively. The injection port 519a is connected to a housing 518a of SOG 507a. The injection port 519b is connected to a housing 518b of the SOG 507b. Although the injection port 519a and 519b are drawn to be attached at the left end of the SOG 507a and the right end of the SOG 507b respectively, many injection ports are actually attached on the side of the SOG 507a and 507b in order to immediately occur the reaction between $Cl_2$ and the BHP solution that is attached at the surfaces of the rotating disks 512a and 512b.

Figure 17:
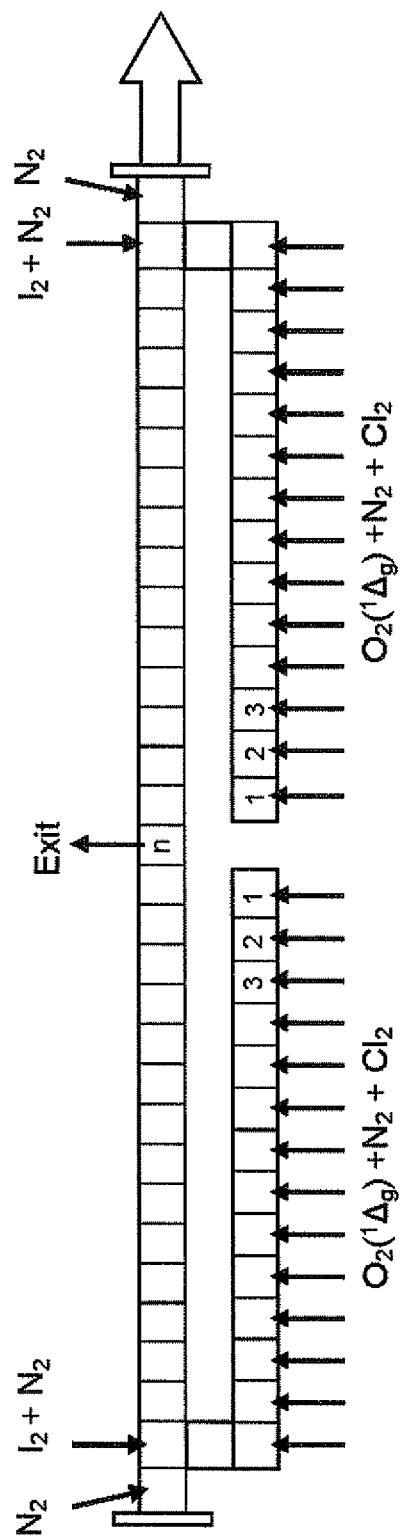
FIG. 17 is a one-dimensional simulation model for a COIL 500.

The simulation model for the COIL 500 is shown in FIG. 17. FIG. 17 shows a one-dimensional model in the laser cavity 504 as well as those in the SOGs 507a and 507b. Since the inside cross-sectional area of the laser cavity 504 is different from those of the inside gas spaces of the SOGs 507a and 507b, the division lengths of the laser cavity 504 and the SOGs 507a and 507b are adjusted to make the residence times the same as each other when the gas flows at the same flow rate as each other.

Before the start of injecting $Cl_2$ and $N_2$ into the SOGs 507a and 507b through the injection ports 519a and 519b to generate $O_2(^1\Delta_g)$, only $N_2$ is injected in the SOGs 507a and 507b to make the whole inside pressure equal to the outside pressure. Before generating singlet oxygen by supplying $Cl_2$, the SOGs 507a and 507b and the laser cavity 504 would be filled with the buffer gas such as $N_2$ or He beforehand at a pressure approximately equal to the outside pressure. This procedure can expel the oxygen from the SOGs 507a and 507b and the laser cavity 504 through the exit port 514. Therefore, it is easier to get a high yield of single oxygen immediately after the start of supplying $Cl_2$ into the SOGs 507a and 507b.

Figure 18:
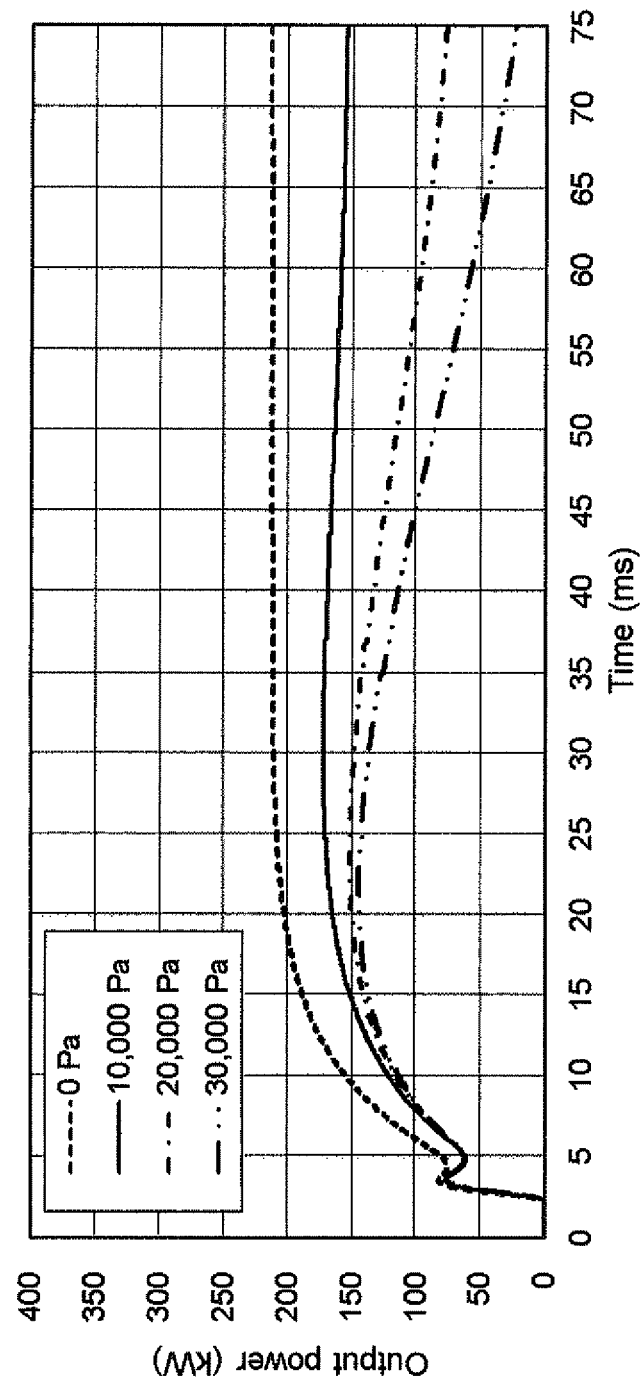
FIG. 18 shows the simulation results in the case of using $N_2$ as a buffer gas.

The simulation results, as parameters of the outside pressure, are shown in FIG. 18. FIG. 18 indicates that the COIL 500 can oscillate continuously when the outside pressure is less than about 10,000 Pa. While, if the outside pressure is higher than about 20,000 Pa, the output power decreases gradually, and finally lasing stops.

Figure 19:
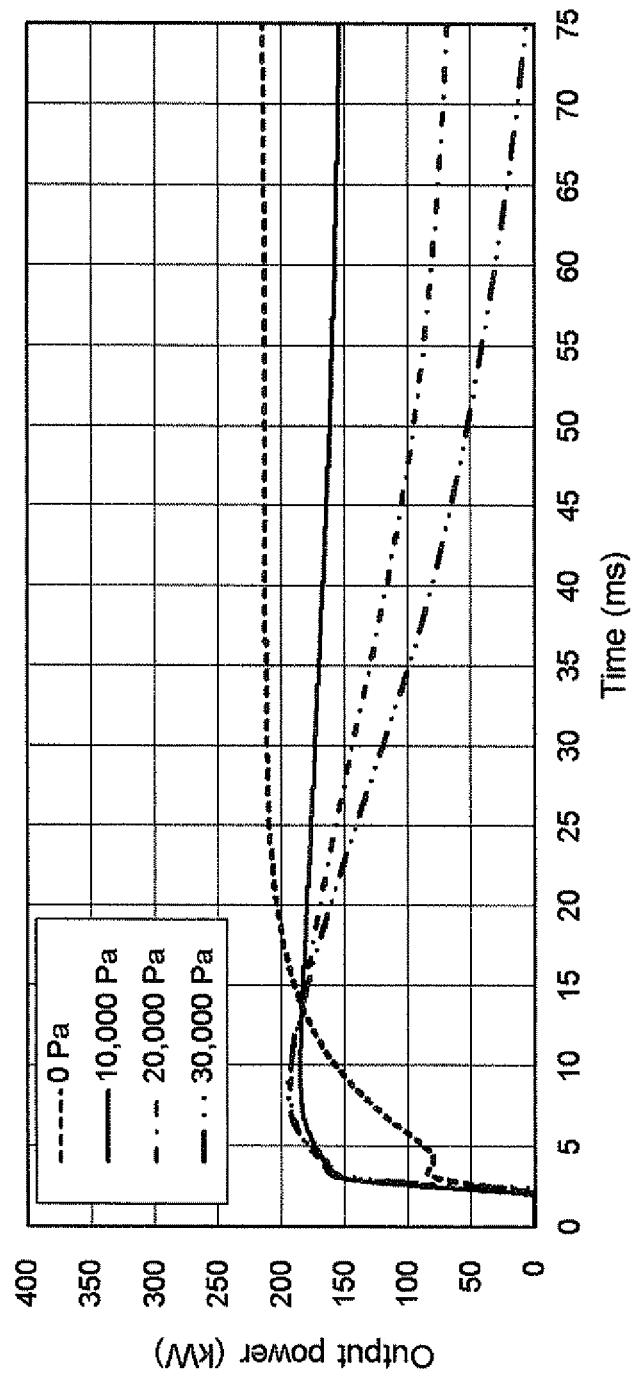
FIG. 19 shows the simulation results in the case of using He as a buffer gas.

Another simulation has also been performed for the COIL 500 in the case of using He as a buffer gas instead of using $N_2$. The simulation results are shown in FIG. 19. FIG. 19 indicates that the COIL 500 can oscillate continuously when the outside pressure is less than about 10,000 Pa. The advantage of using He as a buffer gas is that helium gas is more lightweight than $N_2$ gas.

Moreover, the He buffer gas can be supplied from a balloon used to float the HAA (not shown in FIG. 16) which carries the COIL 500. For example, the HAA is lifted by helium gas. The helium gas as a buffer gas is supplied to the SOG from the HAA. That is, the HAA includes a balloon filled with the helium gas as a lift gas. The helium gas from the balloon HAA is supplied to the COIL as the buffer gas. Therefore, additional gas cylinder for the buffer gas is not necessary. Since a large amount of He is needed to float the HAA, the consumption of He as the buffer gas is negligibly small if the total laser operation time is less than a minute. For example, if the HAA the total buoyancy of 10,000 kg using He, around 400,000 mol of He is necessary. While if the buffer gas is supplied at the flow rate of 100 mol/s, as much as 400 sec. of buffer-gas injection can be realized if it is allowed to lose 1/10 of the buoyancy. It should be noted that less than a few seconds of laser operation is enough to shoot down a missile. Furthermore, during the COIL operation, the oxygen molecules are emitted to the outside of the COIL. Therefore, actually the loss of buoyancy is negligible. The total weight of the COIL get lighter as the oxygen molecules are emitted to the outside. The HAA can fly at a sufficiently high altitude when the buffer gas such as the helium gas is supplied to SOG from the HAA.

These additional simulations have also indicated that the COIL 500 can operate without a vacuum pump when it is located at the altitude of higher than 17 km, where the air pressure becomes less than about 10,000 Pa.

Modified Embodiment

Figure 20:
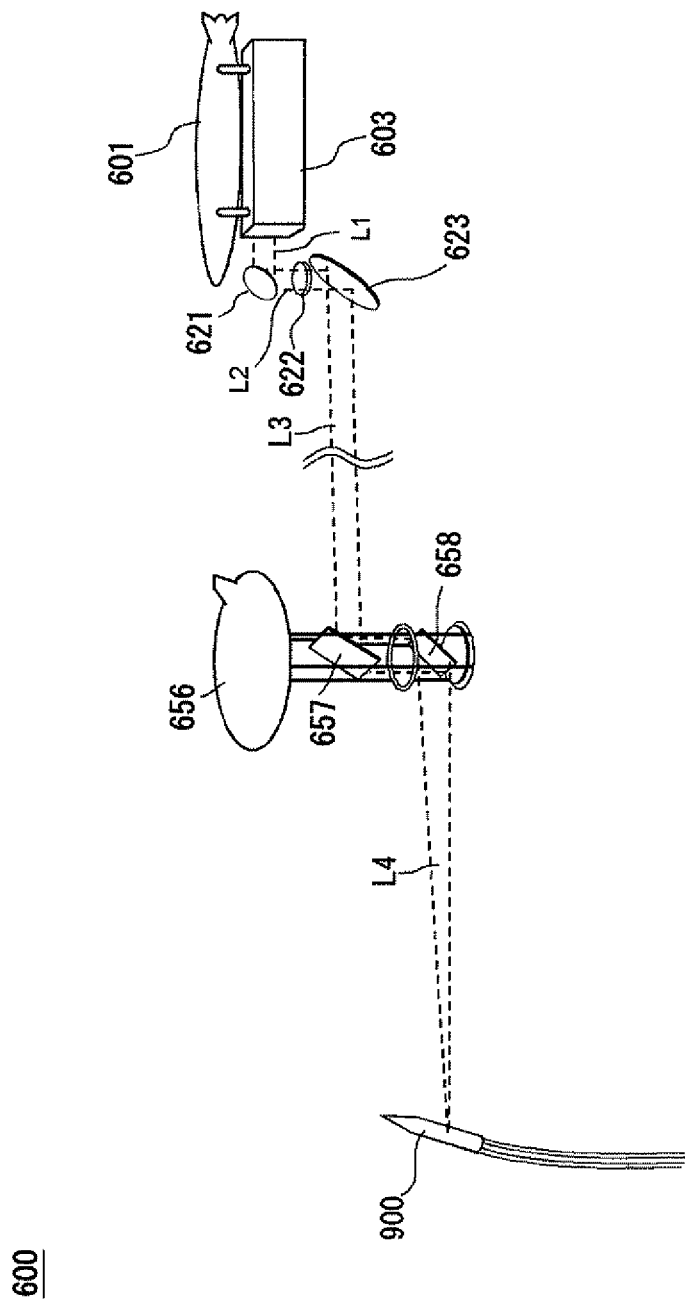
FIG. 20 is a schematic drawing of the iodine laser based defense system 600.

The defense system 600 is explained based on FIG. 20. FIG. 20 is a schematic drawing of the iodine based defense system 600 according to the modified embodiment. In the modified embodiment, the defense system 600 includes a first HAA 601 and a second HAA 656. The first HAA 601 stays at an altitude of higher than 17 km. The HAA 601 carries a COIL 603, a bend mirror 621, a concave lens 622 and a mirror 623. Since the COIL 603 has the same structure as those of the above embodiments, the explanation of the COIL 603 will be omitted. The second HAA 656 carries a rectangular bend mirror 657 and a rectangular focusing mirror 658.

The extracted laser beam L1 reflects at a bend mirror 621, and goes through a concave lens 622. The concave lens 622 expands the laser beam L2. The expanded laser beam L2 from the concave lens 622 comes to the mirror 623. The mirror 623 makes the laser beam L3 be a beam which is substantially a parallel beam or is slightly focused. The mirror 623 can rotate to direct the laser beam L3 to any radial direction. The laser beam L3 propagates for a long distance to the mirror 657. The laser beam L3 from the mirror 623 is incident on the bend mirror 657. The bend mirror 657 reflects the laser beam L3 toward the focusing mirror 658. The focusing mirror 658 is a concave mirror. The focusing mirror 658 reflects and focuses a laser beam L4 at a target missile 900. The first HAA 601 stays at an altitude of higher than 17 km. Therefore, the defense system 600 according to modified embodiment also has the same advantages as those of the above embodiments.

Since the second HAA 656 can stay much closer to the missile 900 at about 20 to 30 km away from missile 900, the focusing mirror 658 can be smaller than the focusing mirror 123 used for the iodine laser defense system 100. Also, the first HAA 601 can stay far away from the missile 900 since the focusing mirror 623 does not have to make a small focusing size at the bend mirror 657 of the HAA 656. Moreover, even if the HAA 656 is shot down by another missile, the COIL 603 carried by the HAA 601 is not destroyed. This is because the HAA 601 can stay as far as several hundreds of kilometers away from the enemy country. This is economically beneficial since the development cost of the HAA 656, the bend mirror 657 and the focusing mirror 658 is much lower than that of the COIL 603. Such defense system using the second HAA 656 is called relay mirrors which is referred to in "The Magic of Relay Mirrors" by Edward A. Duff and Donald C. Washburn in Proceedings of SPIE Vol. 5413, pp. 137-144 (2004).

Figure 21:
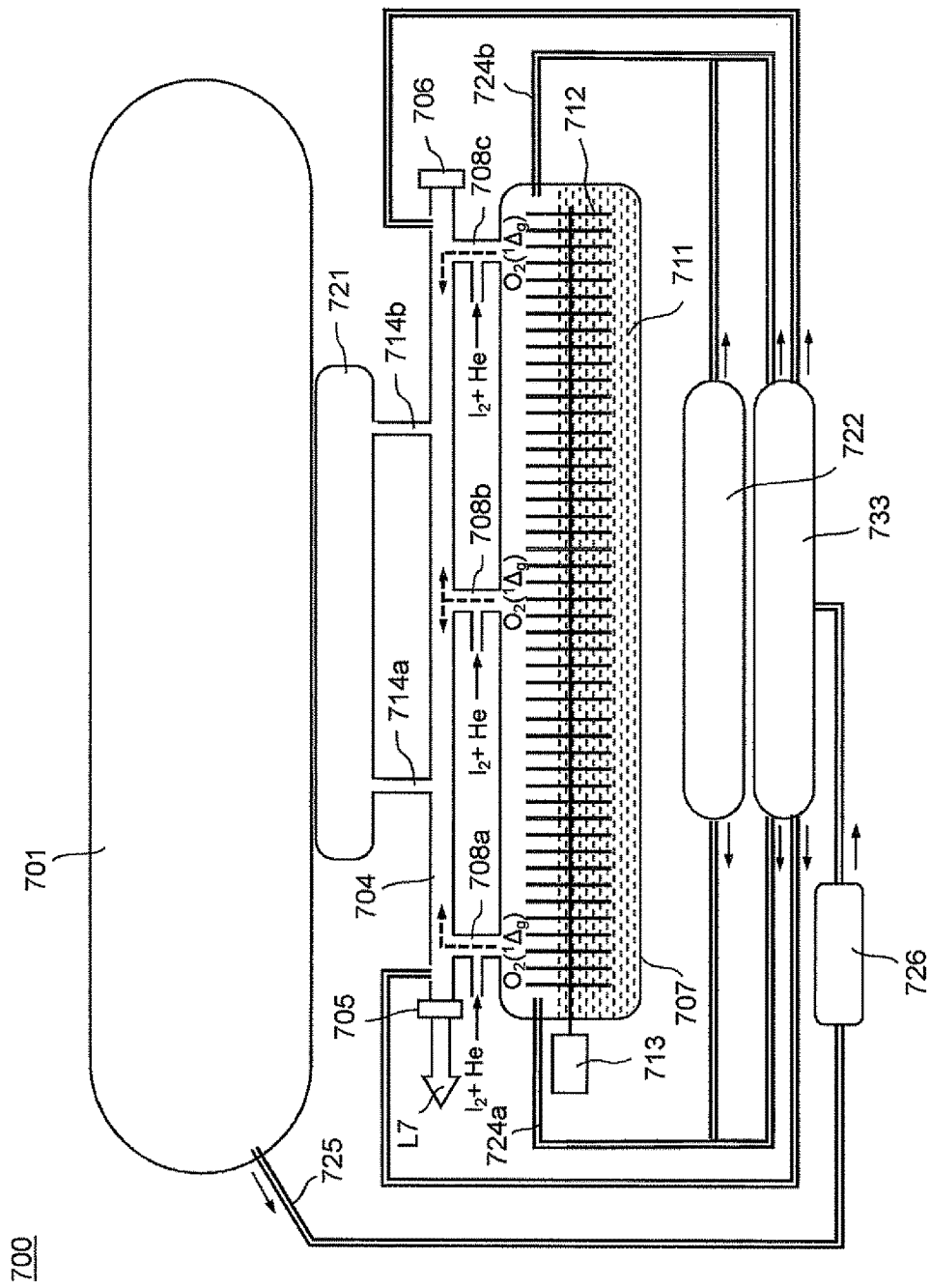
FIG. 21 is a schematic drawing of the iodine laser based defense system 700 according to the fourth embodiment.

Hereinafter, another embodiment in the case of using helium as a buffer gas is explained based on FIG. 21. FIG. 21 is a concept drawing of an iodine laser based defense system 700. The defense system includes an HAA 701 filled with helium which carries a COIL 703. The COIL 703 includes a SOG 707 and a laser cavity 704. The SOG 707 includes rotating disks 712. The rotating disks 712 are half soaked in BHP solution 711. The rotating disks 712 are attached to a motor 713. The laser cavity 704 is connected to input ports 708a, 708b and 708c. The laser cavity 704 is connected to exit ports 714a and 714b. The exit ports 714a and 714b are connected to a recycle bag 721. In order to oscillate the COIL 703, singlet oxygen is supplied into the laser cavity 704 from the SOG 707 through the input ports 708a, 708b and 708c. Iodine molecules and helium are also injected in the input ports 708a, 708b and 708c. Then excited iodine atoms are generated in the laser cavity 704, which gives laser oscillation producing a laser beam L7 from the front mirror 705.

A $Cl_2$ gas cylinder 722 and a helium gas cylinder 733 are connected to the SOG 707. To generate singlet oxygen in the SOG 707, $Cl_2$ gas is supplied to the SOG 707 from the $Cl_2$ gas cylinder 722. Also, helium as a buffer gas is supplied to the SOG 707 from the helium gas cylinder 733. Therefore, mixed gas of $Cl_2$ and He is supplied from the input port 724a and 724b into the SOG 707. The arrows show the gas flow direction.

A compressor 706 is disposed between the helium gas cylinder 733 and the HAA 701. In the helium gas cylinder 733, high pressure helium is stored at first. When a pressure of inside helium decreases at the pressure lower than the outside pressure, helium is supplied from the HAA 701 though the compressor 726. Therefore, high pressure helium can always be stored in the gas cylinder 733.

The effluents in the laser cavity 704 are flowed out from the laser cavity 704 and are collected in the recycle bag 721. The exit gases from the laser cavity 704 are collected in the recycle bag 721. Therefore, helium is not discharged into the outside. This is an economical system since helium is expensive.

The above embodiments can be combined in whole or part as desirable by one of the ordinary skill in the art.

While the invention has been particularly shown and described with reference to exemplary embodiments thereof, the invention includes various modifications which do not negatively affect the purpose and benefits of the invention and is not limited to these exemplary embodiments.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An iodine laser based defense system comprising:
a COIL (Chemical Oxygen Iodine Laser),
an HAA (High Altitude Airship) which carries the COIL and stays at an altitude of higher than 17 km,
wherein the COIL includes a laser cavity and a SOG (Singlet Oxygen Generator),
wherein the laser cavity includes a plurality of input ports connected to the SOG and a plurality of exit ports connected to outside, and
wherein the SOG is filled with a buffer gas at a pressure substantially equal to an outside pressure before supplying Cl2 to the SOG.

2. The iodine laser based defense system according to claim 1, wherein singlet oxygen and iodine, which are supplied in the laser cavity through the input ports, flow along an optical axis of the COIL.

3. The iodine laser based defense system according to claim 1, wherein the COIL includes the SOG,
wherein the HAA is lifted by helium gas, and
wherein the helium gas as a buffer gas is supplied to the SOG from the HAA.

4. The iodine laser based defense system according to claim 1, wherein the COIL includes the SOG,
wherein the HAA is lifted by helium gas, and
wherein the helium gas as a buffer gas is supplied to the SOG from a helium gas cylinder.

5. The iodine laser based defense system according to claim 3, wherein exit gases from the laser cavity are collected in a bag.

6. The iodine laser based defense system according to claim 1, wherein the COIL includes a rotating-disk type SOG.

7. The iodine laser based defense system according to claim 1, further comprising an additional HAA which carries a focusing mirror,
wherein a laser beam from the COIL is incident on the focusing mirror.

* * * * *